US012017790B2

(12) United States Patent
Swain et al.

(10) Patent No.: US 12,017,790 B2
(45) Date of Patent: Jun. 25, 2024

(54) AIRCRAFT AUXILIARY POWER UNIT

(71) Applicants: ROLLS-ROYCE PLC, London (GB); ROLLS-ROYCE CORPORATION, Indianapolis, IN (US)

(72) Inventors: Daniel Swain, Fishers, IN (US); Rory D. Stieger, Derby (GB); Mark D. Taylor, Derby (GB)

(73) Assignees: ROLLS-ROYCE plc, London (GB); ROLLS-ROYCE CORPORATION, Indianapolis, IN (US)

( * ) Notice: Subject to any disclaimer, the term of this patent is extended or adjusted under 35 U.S.C. 154(b) by 242 days.

(21) Appl. No.: 17/061,079

(22) Filed: Oct. 1, 2020

(65) Prior Publication Data
US 2021/0122488 A1 Apr. 29, 2021

(30) Foreign Application Priority Data
Oct. 23, 2019 (GB) ...................................... 1915307

(51) Int. Cl.
*F02C 3/08* (2006.01)
*B64D 27/10* (2006.01)
*B64D 41/00* (2006.01)
*F02C 6/00* (2006.01)
*H02K 11/33* (2016.01)
(52) U.S. Cl.
CPC ............. *B64D 41/00* (2013.01); *B64D 27/10* (2013.01); *F02C 3/08* (2013.01); *F02C 6/00* (2013.01); *H02K 11/33* (2016.01); *F05D 2220/32* (2013.01); *F05D 2220/50* (2013.01)

(58) Field of Classification Search
CPC .. F02C 7/26; F02C 7/268; F02C 7/275; F02C 7/32; F02C 7/36; F02C 7/042
See application file for complete search history.

(56) References Cited

U.S. PATENT DOCUMENTS

| 4,091,613 A | * | 5/1978 | Young | F02C 6/08 60/785 |
| 4,684,081 A | | 8/1987 | Cronin | |

(Continued)

FOREIGN PATENT DOCUMENTS

| EP | 0975862 B1 | * | 1/2003 | ............. F02C 7/143 |
| EP | 2492451 A2 | * | 8/2012 | ............. B64D 33/00 |

(Continued)

OTHER PUBLICATIONS

Go-Hz.com, "Why we use 115v 400Hz power supply in aircraft?" <http://www.gohz.com/why-we-use-115v-400hz-power-supply-in-aircraft> (Year: 2016).*

(Continued)

*Primary Examiner* — Thuyhang N Nguyen
(74) *Attorney, Agent, or Firm* — Oliff PLC

(57) ABSTRACT

An auxiliary power unit (10) for an aircraft (1) comprises a gas turbine engine comprising an engine core (12). The engine core comprises a core compressor (14) and core turbine (18) coupled by a core shaft (24). The auxiliary power unit further comprises a load spool comprising a load compressor (30), a load turbine (20) and a permanent magnet electric machine (28), each being coupled by a load shaft (26). The load shaft (26) and core shaft (24) are configured to rotate independently of one another.

15 Claims, 9 Drawing Sheets

(56) References Cited

U.S. PATENT DOCUMENTS

| | | | | |
|---|---|---|---|---|
| 5,490,645 | A * | 2/1996 | Woodhouse | B64D 41/00 |
| | | | | 454/71 |
| 10,053,030 | B2 * | 8/2018 | Vyas | H02J 3/46 |
| 10,647,438 | B2 * | 5/2020 | Armstrong | F04D 29/362 |
| 2005/0056021 | A1 * | 3/2005 | Belokon | F02C 9/32 |
| | | | | 60/734 |
| 2010/0105259 | A1 * | 4/2010 | Wejrzanowski | B63H 21/17 |
| | | | | 318/400.23 |
| 2015/0246733 | A1 | 9/2015 | Silet et al. | |
| 2016/0369695 | A1 * | 12/2016 | Perlak | F02C 3/04 |
| 2017/0051667 | A1 | 2/2017 | Godman | |
| 2017/0074166 | A1 * | 3/2017 | Gagne | H02K 7/1823 |
| 2019/0032557 | A1 * | 1/2019 | Roach | F02C 7/042 |
| 2019/0077514 | A1 * | 3/2019 | Silet | B64D 13/02 |
| 2020/0141327 | A1 * | 5/2020 | Redford | F02C 3/04 |
| 2021/0207543 | A1 * | 7/2021 | Rougier | F01D 15/10 |

FOREIGN PATENT DOCUMENTS

| | | | | |
|---|---|---|---|---|
| EP | 2733312 | A2 * | 5/2014 | F01D 15/10 |
| WO | 98/48162 | A1 | 10/1998 | |

OTHER PUBLICATIONS

Feb. 25, 2021 Extended Search Report issued in European Patent Application No. 20201451.0.

* cited by examiner

AIRCRAFT AUXILIARY POWER UNIT

The present disclosure concerns aircraft auxiliary power units and methods of operating the same.

Aircraft are frequently provided with Auxiliary Power Units (APUs) in the form of gas turbine engines. These typically provide electrical power and compressed air for starting the main gas turbine engines, and for providing air conditioning and electrical power for aircraft systems when the main engines are not running.

However, use of the APU at some airports is restricted, since APUs have high emissions, such as $CO_2$, $NO_x$, CO and UHCs. Consequently, it is an aim of the present disclosure to provide an improved APU, which allows for improved operation in order to reduce harmful emissions.

According to a first aspect there is provided an auxiliary power unit for an aircraft comprising;
 a gas turbine engine comprising an engine core comprising a core compressor and core turbine coupled by a core shaft;
 a load spool comprising a load compressor, a load turbine and a permanent magnet electric machine, each being coupled by a load shaft;
 wherein the load shaft and core shaft are configured to rotate independently of one another.

The permanent magnet electric machine may be directly coupled to the load turbine by the load shaft, such that the load turbine and electric machine rotate at the same speed.

The auxiliary power unit may comprise a power electronics unit coupled to the electric machine.

The power electronics unit may comprise a first AC to DC converter configured to convert AC electrical power output from the electric machine to DC electrical power. The first AC to DC converter may be bi-directional, and may be configured to convert DC electrical power to AC electrical output to the electric machine.

The power electronics unit may comprise a DC to DC voltage converter configured to convert DC voltage output from the first AC to DC converter to a different voltage. The voltage converter may be configured to output DC power at approximately 24 Volts.

The power electronics unit may comprise a first DC to AC converter configured to convert DC electrical power output from the rectifier to AC electrical power. The DC to AC converter may be configured to output AC electrical power at 115 Volts RMS, and may be configured to output AC electrical power at approximately 400 Hz. The DC to AC converter may be bi-directional, and may be configured to convert AC electrical power to DC electrical power.

In view of the provision of power electronics, power produced by the permanent magnet electric machine can be provided at a constant desired voltage and frequency, irrespective of rotational speed. Additionally, both AC and DC power can be provided from the same generator. Consequently, only a single electric machine is required, and the free power turbine can operate at a wide range of speeds, without affecting the output voltage and frequency produced by the machine.

The core compressor may comprise an axial compressor section upstream of a centrifugal compressor section, each coupled to the core shaft. Advantageously, a relatively high pressure ratio can be achieved, with a single shaft, in a relatively compact configuration.

The core turbine may comprise a single stage.

The free power turbine may comprise two or more stages.

The load compressor may comprise variable inlet guide vanes. Advantageously, the load compressor can produce pressurised air at a desired pressure, substantially independently of rotational speed. Again therefore, the load turbine can vary in speed, without affecting air delivery pressure.

The auxiliary gas turbine engine may comprise a starter motor coupled to the core shaft. Alternatively, the gas turbine engine may comprise a clutch configured to selectively couple the core shaft and load shaft. Advantageously, the electric machine coupled to the load shaft could be utilised as a starter motor, thereby further reducing total weight.

The gas turbine engine may comprise an accessory drive coupled to the core shaft. The accessory drive may comprise an accessory gearbox, and may be coupled to one or more of a fuel pump, an oil pump, and the starter motor. Advantageously, since the accessory drive is coupled to the core shaft and not the load shaft, driving the load shaft does not drive the accessory shaft, thereby reducing wear of these components, and reducing overall load.

According to a second aspect there is provided an aircraft comprising a main propulsive gas turbine engine and an auxiliary power unit according to the first aspect of the invention.

According to a third aspect there is provided a method of operating an auxiliary power system according to the first aspect, the method comprising:
 running the engine core to provide high pressure gas flow to the load turbine to drive the load compressor to provide compressed air to the aircraft, and to drive the permanent magnet electric machine as a generator;
 using electric power provided by the generator to provide electric power to aircraft ancillary systems.

According to a fourth aspect there is provided a method of operating an auxiliary power system according to the first aspect, the method comprising:
 providing electric power to the permanent magnet electric machine, to drive the electric machine as a motor, such that the electric machine drives the load compressor, to provide compressed air to the aircraft.

The method may comprise providing compressed air to an air turbine starter to start one or more main propulsion gas turbines. The method may comprise providing compressed air to an environmental control system.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Figure 1:
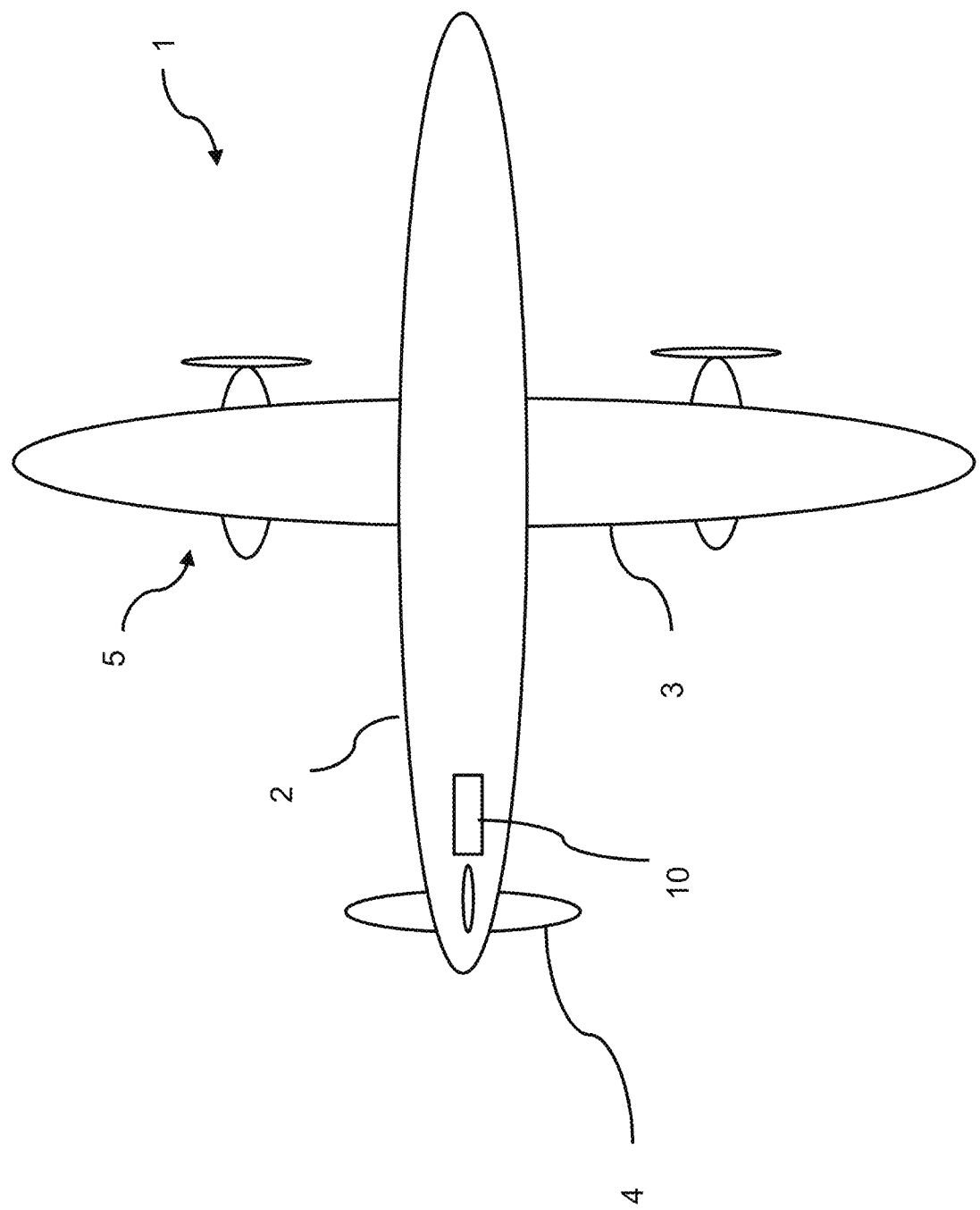
FIG. 1 is a plan view of a first aircraft comprising a primary propulsion system and an auxiliary power system.

With reference to FIG. 1, an aircraft 1 is shown. The aircraft is of conventional configuration, having a fuselage 2, wings 3, tail 4 and a pair of propulsion systems 5. Each propulsion system comprises a propulsive gas turbine engine, which provides the majority of the propulsive power for the aircraft. The propulsive gas turbine engines (also known as "main engines") typically also comprise electric machines (not shown), which act as generators to provide electric power when the propulsion systems 5 are operating. The propulsion systems also provide compressed air for various purposes, including aircraft air conditioning systems (also known as "Environmental Control Systems", or ECS). However, where the propulsion systems 5 are not operating, such as when the aircraft is being loaded at the airport, provision must be made for both electric power and compressed air.

Consequently, the aircraft further comprises an Auxiliary Power Unit (APU) 10. The APU is typically situated at the aft of the aircraft 1, and is shown in further detail in FIG. 2.

The APU 10 includes an internal combustion engine in the form of a gas turbine engine core 12. The gas turbine engine core 12 comprises, in axial flow series, a compressor 14, combustion equipment 16, a core turbine 18, and a load turbine 20.

The gas turbine engine 10 works in the conventional manner so that core air flows through the compressor 14 where it is compressed, before delivering that air to the combustion equipment 16, where it is mixed with fuel and the mixture combusted. The resultant hot combustion products then expand through, and thereby drive the turbines 18, 20 before being exhausted through a nozzle 22. Typically, the nozzle 22 is not configured to provide significant thrust, in contrast to the thrusting main engines 5. The high-pressure turbine 18 drives the compressor 14 by an interconnecting core shaft 24. An accessory gearbox 32 is also coupled to the core shaft 24.

The load turbine 20 is coupled to a load shaft 26. The load shaft 26 is in turn coupled to load in the form of an electric machine 28, and a load compressor 30. The load shaft 26 is decoupled from the core shaft 24, and so the shafts 24, 26 rotate independently of one another. The load compressor 30 is configured to provide compressed air to the aircraft 1, and the electric machine 28 is configured to provide electric power to the aircraft 1 via power electronics 34 when operated as a generator.

Figure 3:
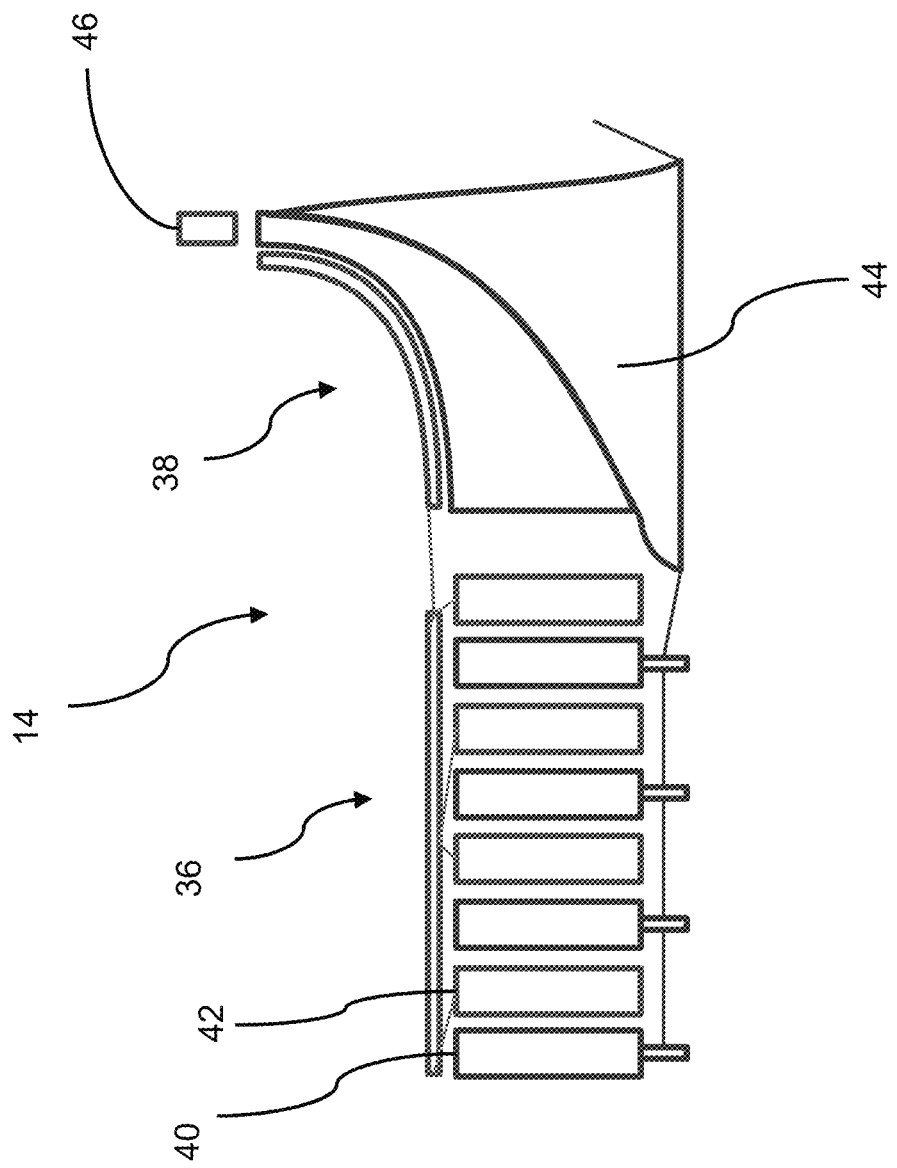
FIG. 3 is a schematic diagram of the core compressor of the auxiliary power system of FIG. 2.

Details of the compressor 14 are shown in FIG. 3. As can be seen, the compressor 14 comprises multiple stages, including an axial section 36 followed by a downstream centrifugal section 38.

The axial section 36 comprises at least one compressor stage, each stage comprising an axial compressor rotor 40, and an axial compressor stator 42, which operate in a conventional manner known to the skilled person. Similarly, the centrifugal section 38 comprises a single centrifugal stage comprising a centrifugal rotor 44 and a diffuser 46, which again act in a known manner. In combination, the compressor 14 raises the pressure of air entering the gas turbine engine core 12.

Figure 4:
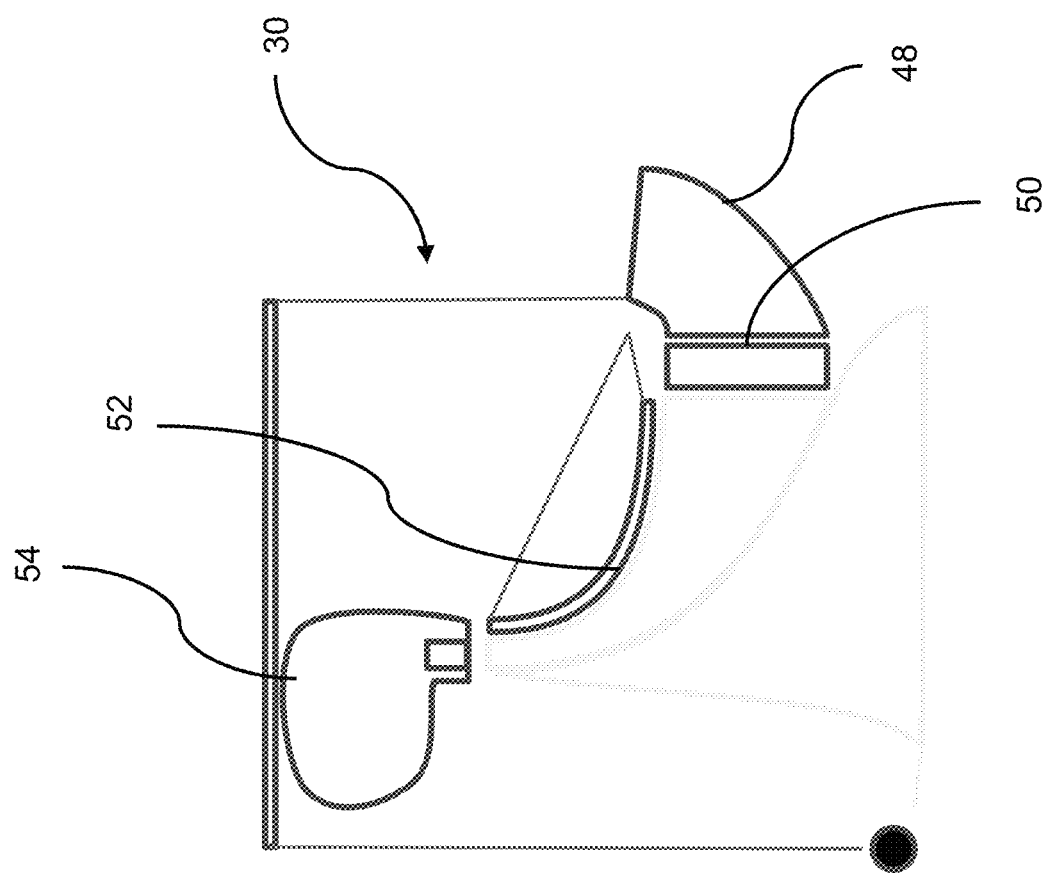
FIG. 4 is a schematic diagram of the load compressor of the auxiliary power system of FIG. 2.

Details of the load compressor are shown in FIG. 4. The load compressor 30 is provided separately to the core compressor 14, and comprises an intake 48, which may be shared with the core compressor 14. Downstream of the intake is a Variable Inlet Guide Vane (VIGV) 50, which is configured to vary the inlet area to the compressor 30. By varying the inlet area, the geometry of the compressor 50 can be varied to control the compressed air flow rate and pressure independently of rotational speed. Advantageously, the compressor 30 can be controlled by the VIGV 50 to provide a required air flow rate and/or pressure as the compressor 30 speeds up and slows down, as the engine core is throttled. Consequently, the engine core can be operated over a wide range of power settings, while continuing to supply air at the required pressure.

Downstream of the VIGV 50 is a compressor rotor 52, which is in the form of a centrifugal compressor rotor. A diffuser 54 is provided downstream of the rotor 52, which raises the pressure of the air delivered by the compressor 30. Consequently, the compressor 30 is similar to the centrifugal stage 38 of the core compressor 14, but differs in that the compressed air from the load compressor 30 is delivered to the aircraft 1, or the main engines 5, rather than to a combustor 16 of the APU engine core 12.

Figure 5:
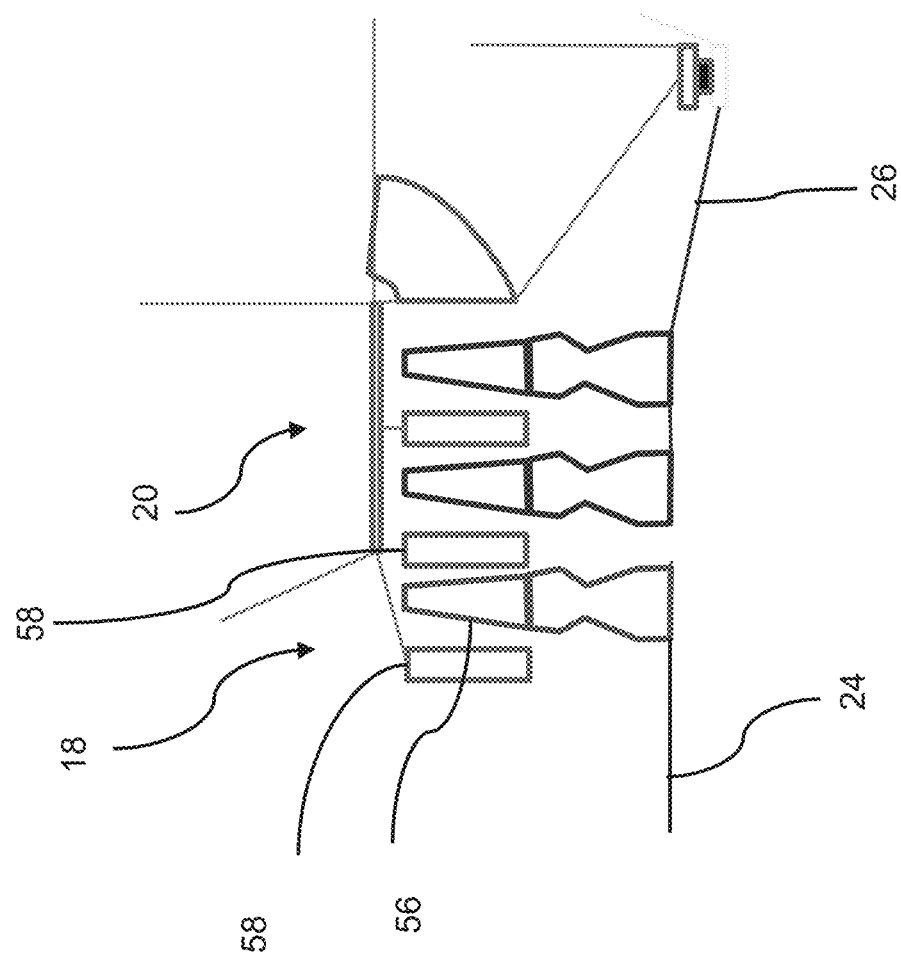
FIG. 5 is a schematic diagram of the turbines of the auxiliary power system of FIG. 2.

FIG. 5 shows the turbines 18, 20 is more detail. Each turbine 18, 20 comprises at least one turbine stage, each stage comprising a turbine rotor 56. One or more turbine stators 58 are also provided. As can be seen, the core turbine 18 comprises a single stage, and the load turbine 20 comprises two stages.

Figure 6:
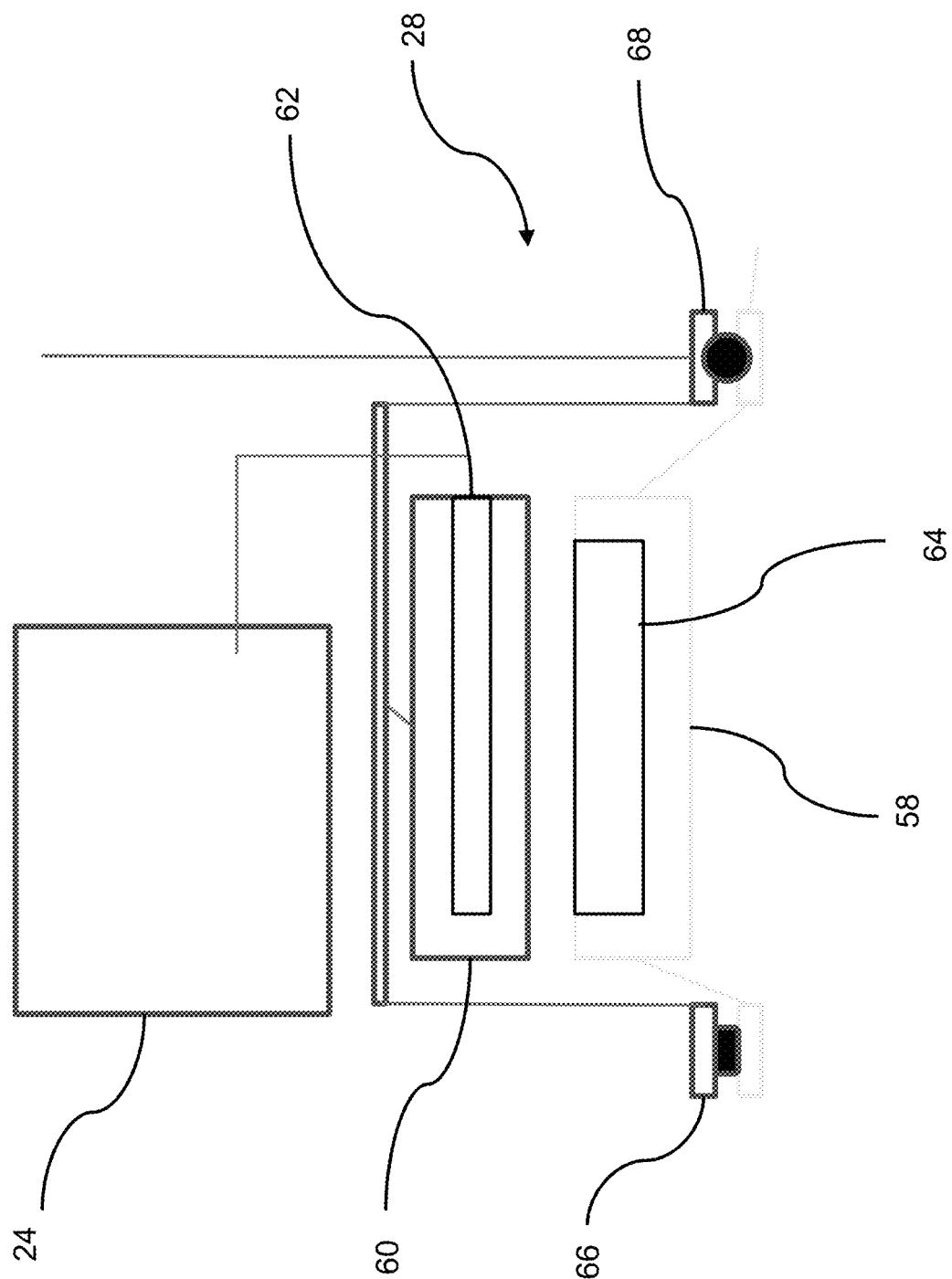
FIG. 6 is a schematic diagram of the electric machine of the auxiliary power system of FIG. 2.

FIG. 6 shows the electric machine 28 in more detail. The electric machine 28 comprises a rotor 58 which is mounted directly to a surface of the load shaft 26, and is supported by bearings 66, 68. The rotor 58 is surrounded by a stator 60, provided radially outwardly of the rotor 58. The stator comprises electrical windings 62, which can be energised to produce a rotating magnetic field. This rotating magnetic field interacts with a magnetic field of the rotor 58, to cause rotation when acting as a motor. The magnetic rotor magnetic field is produced by one or more permanent magnets 64, provided within or on a surface of the rotor 58. Such an arrangement is known in the art as a "permanent magnet synchronous AC electric machine". Such a machine will act as a generator, providing alternating current (AC) electric power as an output when the rotor 58 is rotated. The frequency and magnitude of the AC electric power will vary in proportion to the rotational speed of the rotor 58. Similarly, when the stator windings are energised with AC electric current from an external source, the rotor 58 will rotate at a speed dependent on the frequency of the input AC current, and so will act as a motor.

In view of the requirement for AC electric current having frequency varying in dependence on the rotational speed of the rotor 58 when operating as a motor, and in view of the varying frequency output current when acting as a generator, permanent magnet machines typically require power electronics. Power electronics can provide AC power of varying frequency to act as a motor controller, or can accept AC power of one frequency and convert it to either DC current, or AC current of a different frequency. In the present disclosure, a power electronics unit 34 is coupled to the stators 62 of the electric machine 28.

Figure 7:
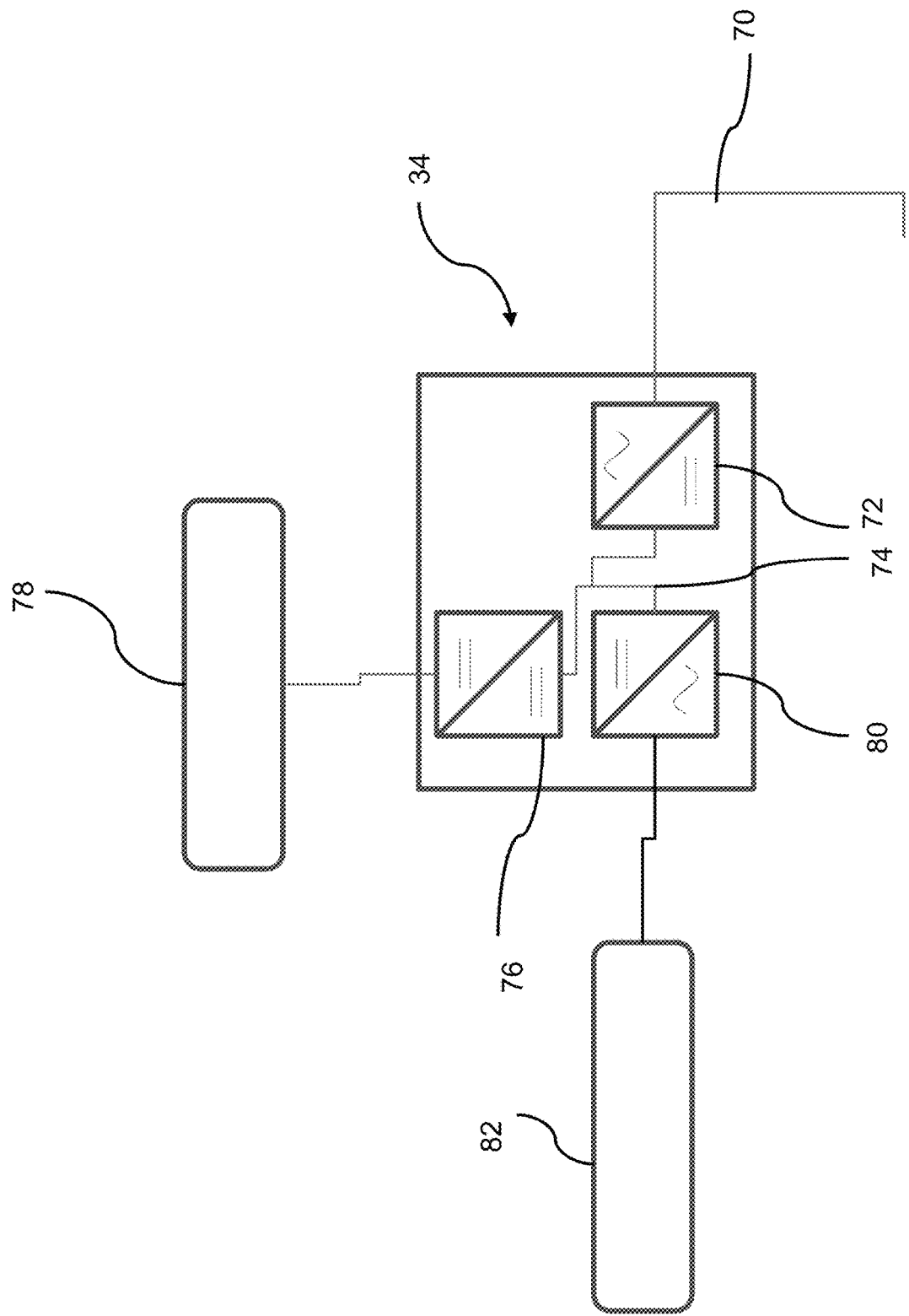
FIG. 7 is a schematic diagram of the power electronics of the auxiliary power system of FIG. 2.

The power electronics unit 34 is shown in more detail in FIG. 7. The unit 34 comprises an electrical connector 70, which electrically couples the unit 34 to the stator windings 62 of the electric machine 28. The connector 70 is coupled to a rectifier 72, which is configured to convert AC electric current from the stator windings 62, to DC current to a DC bus 74.

A DC to DC converter 76 is electrically coupled to the DC bus 74. The DC to DC converter is configured to convert the DC voltage provided by the DC bus 74 to a different voltage required by one or more DC load 78, which are coupled to the DC to DC converter 76. Typically, the DC loads require a fixed, relatively low voltage, and so the DC to DC converter 76 may be configured to provide DC current at a predetermined voltage such as 24 volts DC.

Also electrically coupled to the DC bus 74 is an inverter 80. The inverter 80 is configured to convert DC electrical power from the DC bus 74 to AC electrical power having a desired frequency and magnitude, and provide this AC electrical power to one or more AC loads 82. For example, the inverter 82 may be configured to provide AC electrical power at a voltage of 115 volts, and a frequency of 400 Hz.

Consequently, substantially all of the electrical power generated by the electric machine 28 acting as a generator is converted by the power electronics. Such a system may be referred to as a "fully rated" power electronics system.

In view of the fully rated power electronics system 34, and the provision of a load compressor 30 having VIGVs 50, the load shaft 26 can be allowed to rotate at a large range of speeds, without affecting load compressor 30 output pressure, or generator output frequency. Consequently, the gas turbine can be run at part power, and so part load turbine 20 rotational speed, thereby saving fuel.

Figure 8:
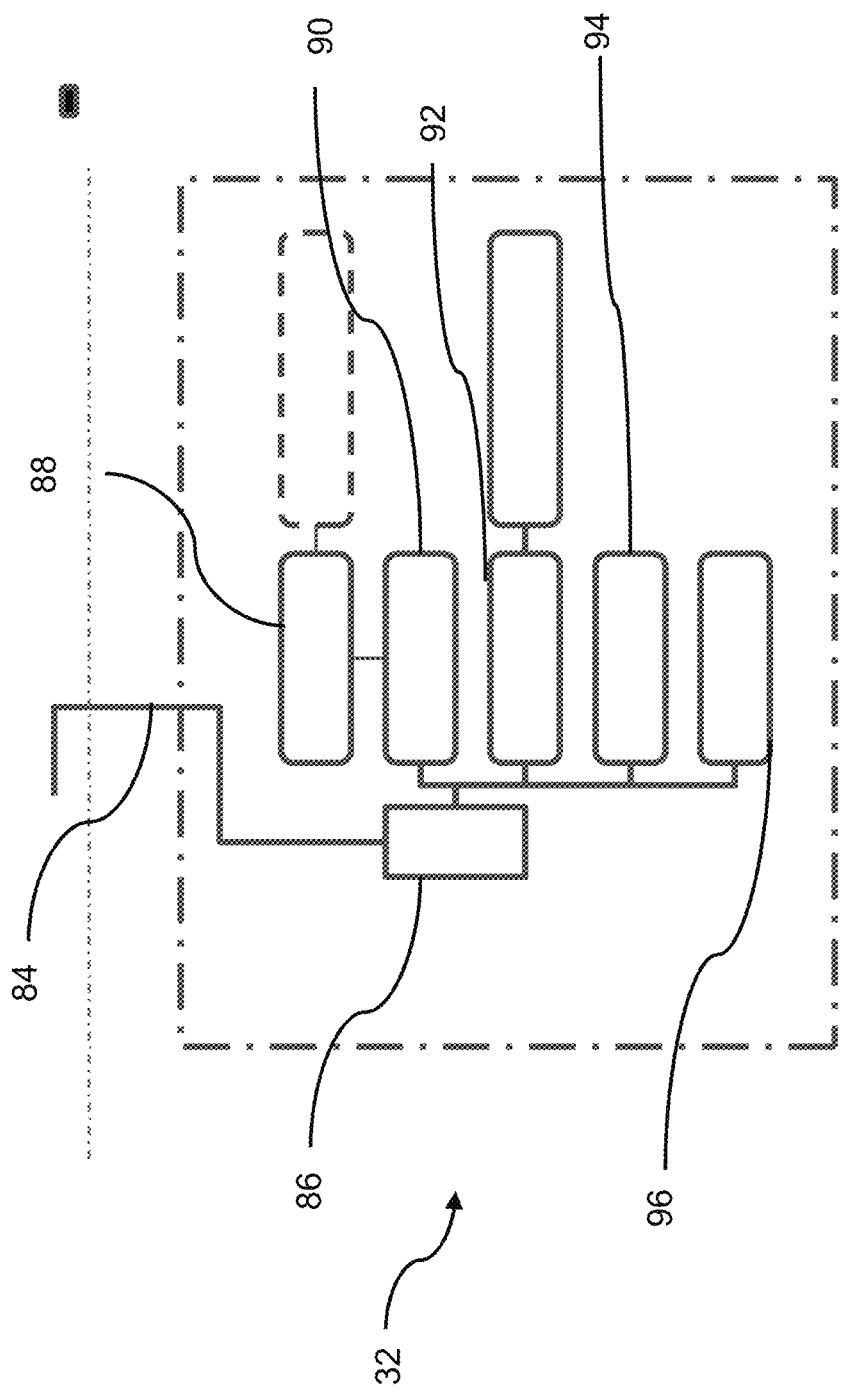
FIG. 8 is a schematic diagram of the accessory gearbox of the auxiliary power system of FIG. 2.

The accessory gearbox 32 is shown in more detail in FIG. 8. The accessory gearbox 32 is coupled to the core shaft 24 by an offtake shaft 84. The offtake shaft 84 is coupled to a reduction gearbox 86, which provides a plurality of pads, each of which may be driven at a different speed.

The accessory gearbox 32 is provided to provide ancillary support for the gas turbine engine 10. Example accessories include a hydro-mechanical unit (HMU), which meters fuel to the combustor 16, a fuel pump 90, which pumps fuel to the combustor 16, an oil pump, which provides lubrication to the engine 10, and cooling fan 94, and a starter generator 96.

A further advantage of the provision of a fully rated power electronics system, is that the load turbine 20 can be operated at a relatively high rotational speed, while providing relatively low frequency AC power output from the generator 28. Ordinarily, a two pole electric machine with an output frequency of 400 Hz would require a turbine spinning at 24,000 RPM. This is a relatively low rotational speed for a small turbine, which typically operated at 50,000 RPM or higher. Conventionally therefore, either a reduction gearbox would be required between the load turbine and generator, or a slow turning, multi-stage load turbine would be required. Either solution would add weight, complexity and cost. Consequently, the present arrangement provide for an efficient, compact, simple arrangement.

The APU 10 can be operated in accordance with a first operating method. Initially, the engine 10 is started using the starter generator 96, which is powered either by ground power, or by an onboard battery (not shown). Once started, the compressor 14 provides air to the combustor 16, which heats the air, and generates hot, high pressure air to the core turbine 18. This high pressure, high temperature air turns the core turbine 18, to power the compressor.

The remaining high pressure, high temperature air downstream of the core turbine 18 continues downstream to the load turbine 20, which thereby drives the load turbine 20. The load turbine in turn rotates the electric machine 28 and load compressor 30 via the load shaft 26, to provide electrical power and compressed air to the aircraft 1.

A further advantage of the present arrangement, is that the electric machine 28 can be operated as a motor 28 by providing the stator windings 62 with electric power. In this mode of operation, and by configuring both the rectifier 72 and the inverter 80 as bi-directional units, AC electrical power can be provided from the aircraft AC electrical loads connection 82 at any suitable frequency and voltage, to the bi-directional inverter (which would convert the AC power to DC power for the DC bus 74), then to the bi-directional rectifier (which would convert the DC power from the DC bus to AC power for the stator windings). Alternatively, power can be provided to the stator windings 62 either from a separate AC motor controller (not shown), or by providing DC power to the DC power bus 74, and utilising the rectifier 72 as a motor controller.

When operated as a motor, the electric machine 28 is configured to drive at least the load compressor 30, and optionally, the load turbine 20. Consequently, by providing electrical power to the electric machine the compressor 40 can be driven to provide pressurised air to the aircraft 1. In addition, a proportion of the electric power can be supplied to the aircraft, which may be converted to the required frequency by the inverter 80. Consequently, by providing only AC or DC power to the aircraft 1 from an external source, each of the DC loads, AC loads, and pressurised air requirements can be met, without running the gas turbine engine 10. Consequently, costs and emissions can be greatly reduced, without requiring installation of additional ground equipment.

Furthermore, the main engines 5 can be started using ground electrical power alone. For instance, ground electrical power can be provided to the electric machine 28, which is operated as a motor to power to the load compressor 30. Compressed air from the load compressor 30 can be fed to compressed air motors coupled to main engine shafts of the main engines 5, to cause them to rotate, to thereby start the main engines. Consequently, the engines 5 can be started without requiring the APU to be run, or requiring additional ground equipment such as air starter equipment.

Consequently, a second operating mode is available, in which the APU is used to provide electrical power and compressed air to the aircraft 1 without operating the gas turbine. In the second mode, electrical power is provided to the power electronics unit 24, which provides electrical power to the electric machine 30, and to the aircraft AC and DC electrical systems. The electric machine 30 then drives the load shaft 26, to power the load compressor 28, to provide pressurised air.

Figure 2:
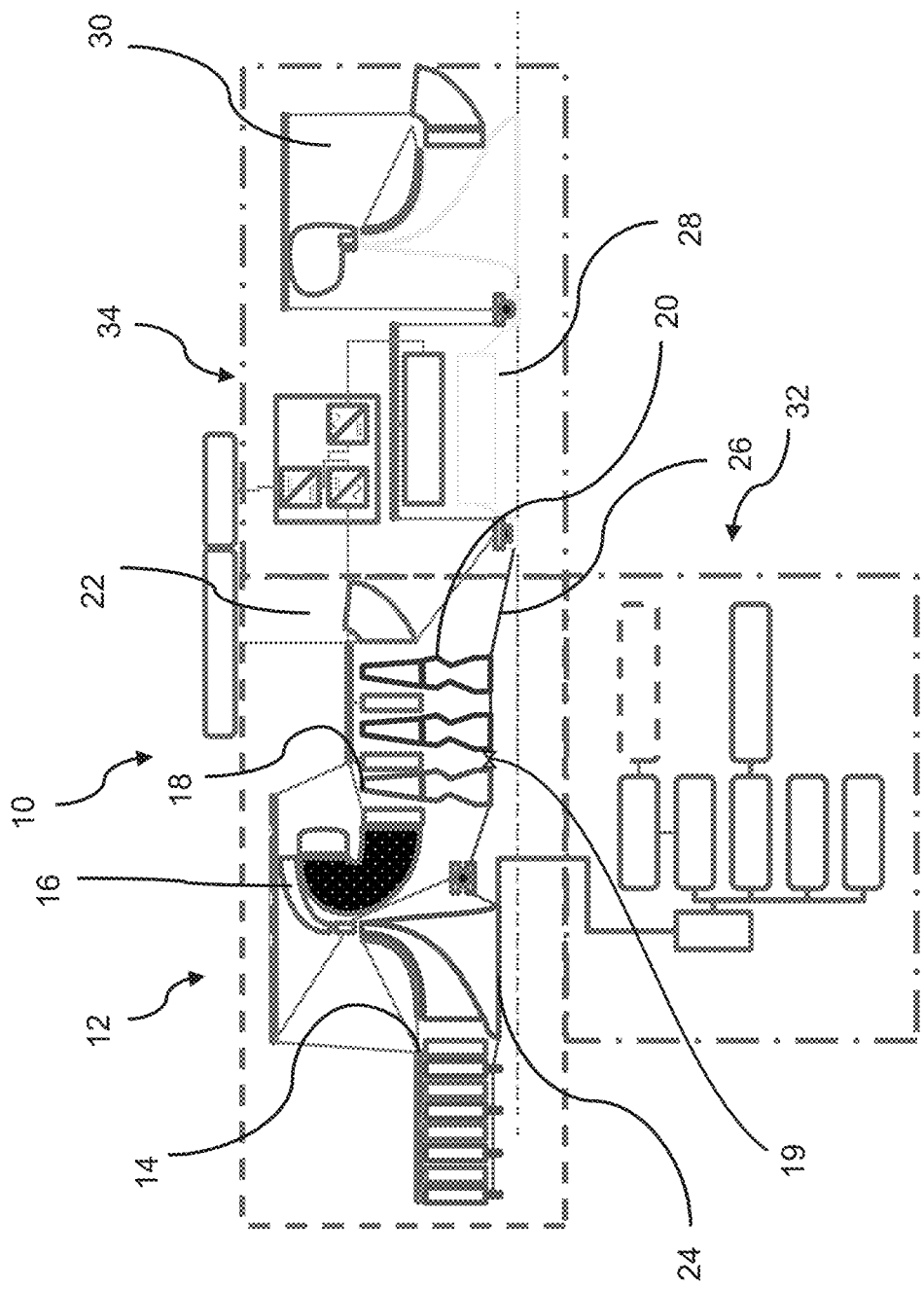
FIG. 2 is a schematic diagram of the auxiliary power system of FIG. 1.

When operated in this mode, it will be understood that the load turbine 20 will typically rotate, as this is coupled to the load shaft 26. However, this will present relatively little drag on the shaft, and so will reduce the efficiency only slightly. As shown in FIG. 2, in some cases, a valve 19 may be provided, which may close to prevent air from entering the load turbine 20, thereby reducing losses further. On the other hand, since the core shaft 24 and load shafts 26 are decoupled, rotation of the load shaft 26 by the electric machine 28 does not result in rotation of the core compressor 14, accessory gearbox 32, or turbine 18. Consequently, the load on the electric machine 28 is greatly reduced, thereby increasing efficiency.

Figure 9:
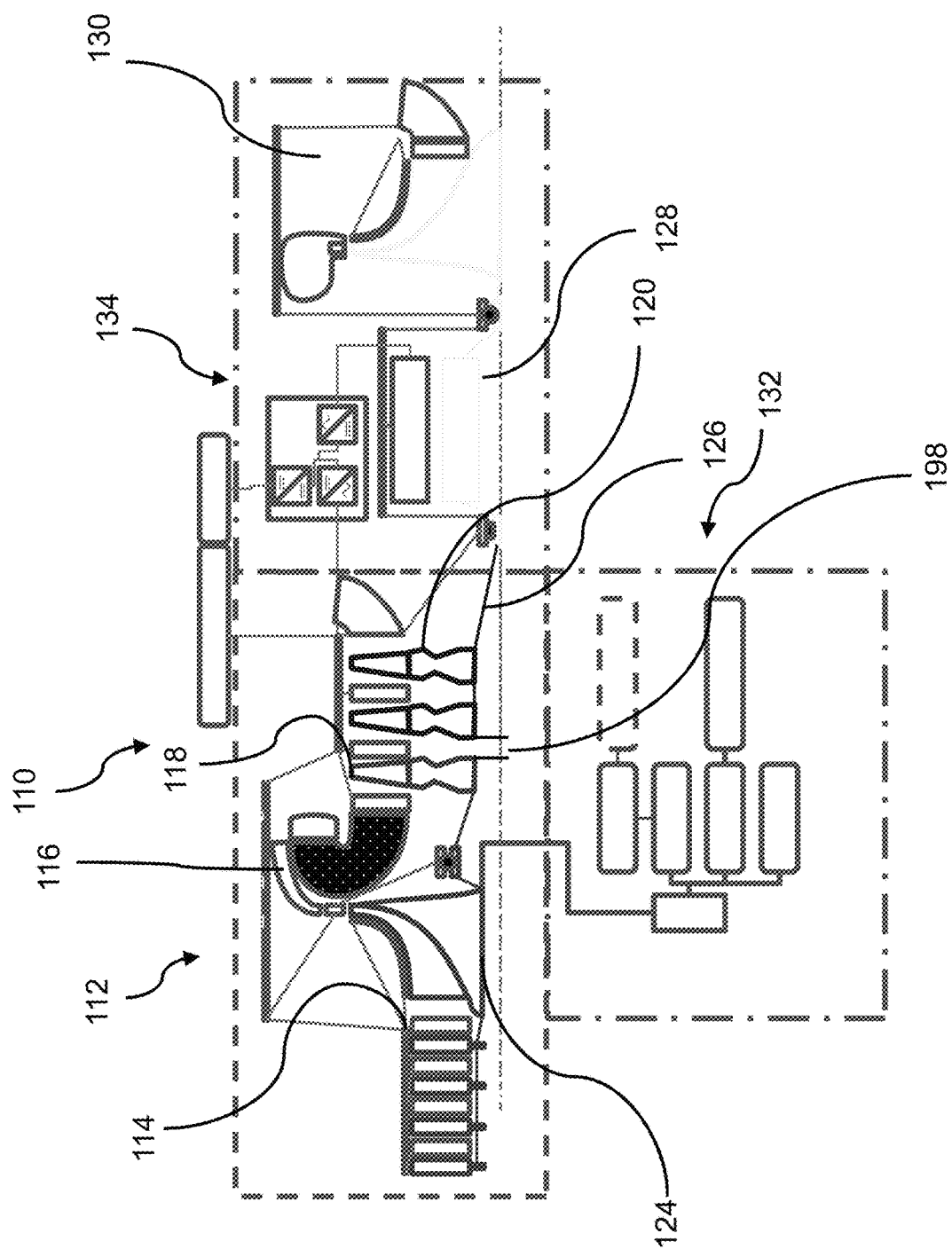
FIG. 9 is a schematic diagram of an alternative auxiliary power system.

FIG. 9 shows an alternative auxiliary power unit (APU) 110, which is similar to the unit 10. Equivalent features to the unit 10 are given the same reference numerals, incremented by 100.

The APU 110 comprises a gas turbine engine core 112 comprising a core compressor 114, combustor 116 and core turbine 118 coupled by a core shaft 124. An independently rotatable load shaft 126 is provided, which is coupled to a load turbine 120, electric machine 128 and load compressor 130. Each of these components is similar to the equivalent components of the unit 10.

However, the unit 110 differs, in that the unit 110 comprises a clutch arrangement 198, which is configured to selectively couple and un-couple the shafts 124, 126. Furthermore, the unit 110 also differs, in that the separate starter motor coupled to the core shaft is omitted.

In operation, the shafts 124, 126 are coupled by the clutch 198 for starting. Power is fed to the electric machine 128, which acts as an electric starter motor. Since the shafts 124, 126 are coupled in this mode, both shafts 124, 126 rotate together, and the core compressor 114 is thus driven. Consequently, the engine core 112 can be started. Once started, the shafts 124, 126 are decoupled by the clutch 198, thereby permitting the load turbine 120 to turn independently of the core turbine. Conversely, the shafts 124, 126 can be decoupled for operation of the load shaft 126 alone, without operation of the gas turbine core 112. Advantageously, the starter can be omitted, which may result in a further reduction of cost and weight. Since the clutch does not typically have to engage when the shafts are spinning (merely disengage), the clutch could be of any suitable type, and could for example comprise a splined sleeve, which engages the two shafts.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, the gas turbine engine could be of a different configuration, such as a two-spool core, comprising high- and low-pressure compressors coupled to high and low pressure shafts, independently of each other, and independently of the load shaft. Similarly, the core compressor could be of a different type. For example, the core compressor could comprise all axial stages, a single centrifugal stage, or a plurality of centrifugal stages.

The invention claimed is:

1. An auxiliary power unit for an aircraft comprising;
    a gas turbine engine comprising an engine core comprising a core compressor and core turbine coupled by a core shaft;
    a load spool comprising a load compressor, a load turbine and a permanent magnet electric machine, each being coupled by a load shaft; and
    circuitry, wherein:
    the load shaft and core shaft are configured to rotate independently of one another, and
    the electric machine includes a power electronics unit coupled to the electric machine such that the circuitry is configured to cause the gas turbine engine to operate:
        (i) with the gas turbine engine running and with compressed air from the engine core not being prevented from entering the load turbine, and
        (ii) with the gas turbine engine not running, the electric machine being configured to operate as a motor configured to drive the load compressor to provide compressed air to the aircraft, and uncompressed air being prevented from entering the load turbine from the engine core by way of closure of a valve.

2. An auxiliary power unit according to claim 1, wherein the permanent magnet electric machine is directly coupled to the load turbine by the load shaft, such that the load turbine and electric machine rotate at the same speed.

3. An auxiliary power unit according to claim 1, wherein the power electronics unit comprises a first AC to DC converter configured to convert AC electrical power output from the electric machine to DC electrical power.

4. An auxiliary power unit according to claim 3, wherein the first AC to DC converter is bi-directional, and is configured to convert DC electrical power to AC electrical output to the electric machine.

5. An auxiliary power unit according to claim 3, wherein the power electronics unit comprises a DC to DC voltage converter configured to convert DC voltage output from the first AC to DC converter to a different voltage.

6. An auxiliary power unit according to claim 5, wherein the voltage converter is configured to output DC power at 24 Volts.

7. An auxiliary power unit according to claim 3, wherein the power electronics unit comprises a first DC to AC converter configured to convert DC electrical power output from the first AC to DC converter to AC electrical power.

8. An auxiliary power unit according to claim 7, wherein the first DC to AC converter is configured to output AC electrical power at 115 Volts RMS, and is configured to output AC electrical power at 400 Hz.

9. An auxiliary power unit according to 7, wherein the first DC to AC converter is bi-directional, and is configured to convert AC electrical power to DC electrical power.

10. An auxiliary power unit according to claim 1, wherein the core compressor comprises an axial compressor section upstream of a centrifugal compressor, each coupled to the core shaft.

11. An auxiliary power unit according to claim 1, wherein the load compressor comprises variable inlet guide vanes.

12. An auxiliary power unit according to claim 1, wherein the gas turbine engine comprises an accessory drive coupled to the core shaft.

13. An auxiliary power unit according to claim 1, wherein the gas turbine engine comprises a clutch configured to selectively couple the core shaft and load shaft.

14. An aircraft comprising a main propulsive gas turbine engine and an auxiliary power unit according to claim 1.

15. An auxiliary power unit according to claim 1, wherein the motor drives both the load compressor and the load turbine when the gas turbine is not running.

* * * * *